(12) United States Patent
Baumeler et al.

(10) Patent No.: US 6,420,666 B1
(45) Date of Patent: Jul. 16, 2002

(54) METHOD OF WEIGHING A LOAD ON A BALANCE AND APPARATUS FOR PERFORMING THE METHOD

(75) Inventors: Martin Baumeler, Zürich; Denis Maillard, Meltmenstetten; Roland Nater, Winterthur; Bruno Nufer, Illnau, all of (CH)

(73) Assignee: Mettler-Toledo GmbH, Greifensee (CH)

( * ) Notice: Subject to any disclaimer, the term of this patent is extended or adjusted under 35 U.S.C. 154(b) by 0 days.

(21) Appl. No.: 09/611,462

(22) Filed: Jul. 7, 2000

(30) Foreign Application Priority Data

Jul. 8, 1999 (CH) ................................................. 1250/99

(51) Int. Cl.[7] ......................... G01G 19/00; G01G 21/28
(52) U.S. Cl. ...................... 177/145; 177/180; 177/243; 177/262; 177/229
(58) Field of Search ................................. 177/146, 145, 177/229, 180, 243, 262

(56) References Cited

U.S. PATENT DOCUMENTS

| | | | | | |
|---|---|---|---|---|---|
| 3,032,131 | A | * | 5/1962 | Schmerl | 177/145 |
| 4,107,985 | A | * | 8/1978 | Sommer | 177/229 |
| 4,497,386 | A | * | 2/1985 | Meier | 177/229 |
| 5,606,153 | A | * | 2/1997 | Fix, Sr. et al. | 177/146 |
| 5,835,982 | A | * | 11/1998 | Lanaro et al. | 177/145 |
| 6,210,727 | B1 | * | 4/2001 | Miller et al. | 177/145 |

FOREIGN PATENT DOCUMENTS

GB  2123158  * 6/1983 ................. 177/146

* cited by examiner

Primary Examiner—Randy W. Gibson
(74) Attorney, Agent, or Firm—Friedrich Kueffner

(57) ABSTRACT

In a method of weighing a load on a balance (1), the load is passed between three different locations, i.e., a stationary holding location (17), a load-handling device, and a load-receiver portion of the balance. At least one of the locations has vertically stacked load-receiving positions. The load receiving positions are horizontally cantilevered forks or beams on which the weighing loads are either set down or suspended.

13 Claims, 5 Drawing Sheets

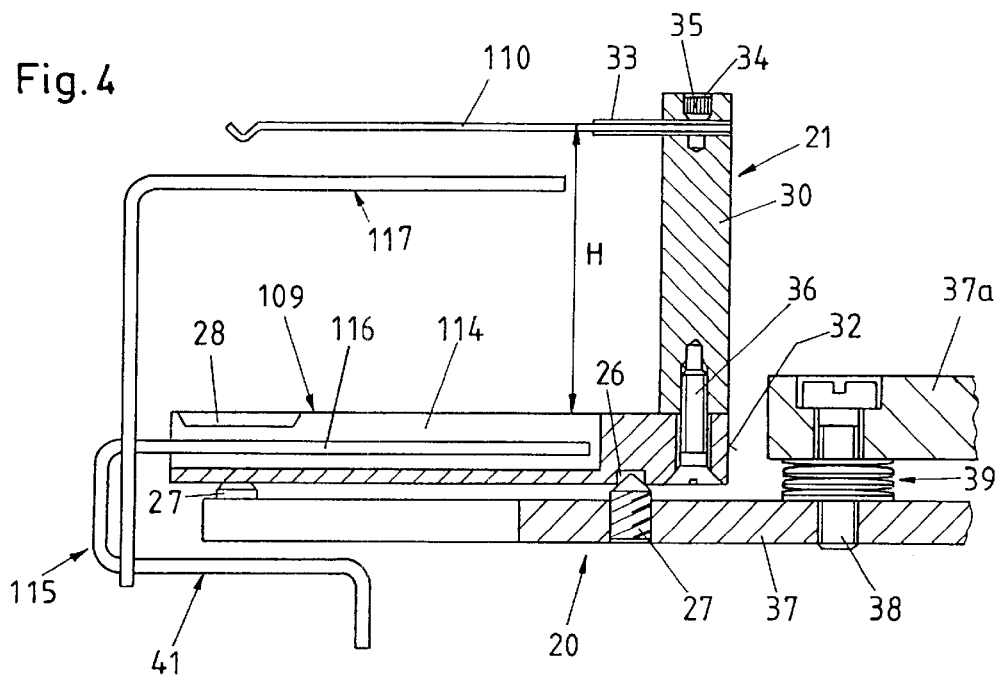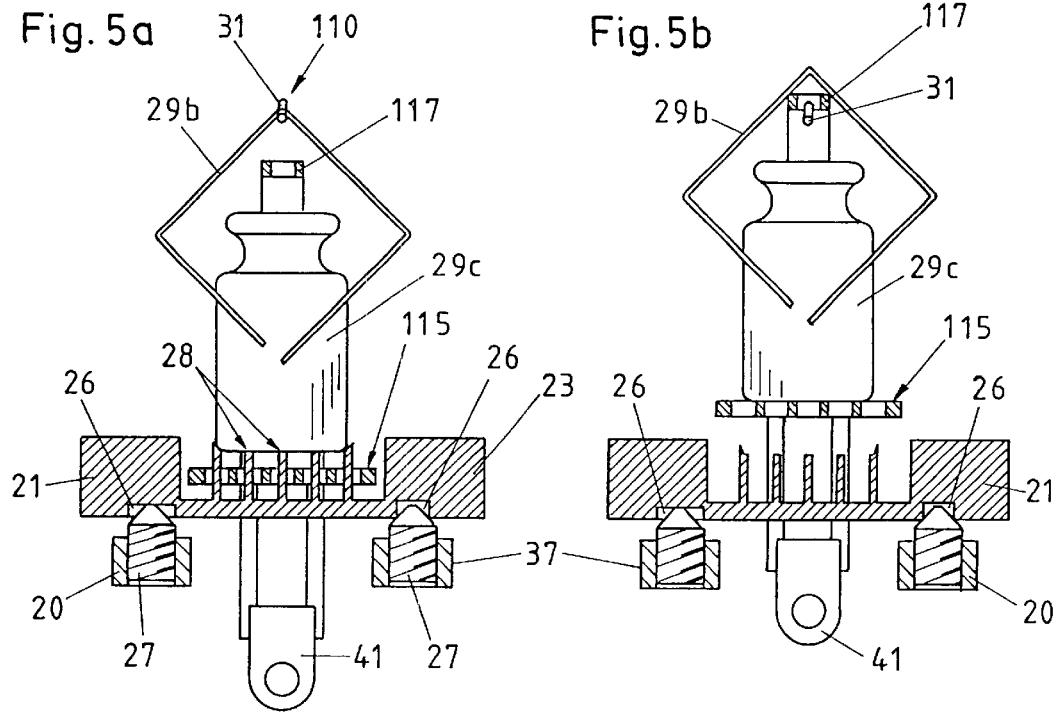

METHOD OF WEIGHING A LOAD ON A BALANCE AND APPARATUS FOR PERFORMING THE METHOD

BACKGROUND OF THE INVENTION

The present invention relates to a method of weighing a load on a balance equipped with load-receiving devices for loads of different shapes and sizes, wherein the load is set down in at least one of three locations, one of which is a stationary holding location, another location is a load-handling device, and a third location is a load-receiver portion of the balance. In particular, the balance is a mass-comparator balance, and the load consists of weights or mass standards of different shapes and sizes. The load-receiver portion supports the weight of the load and channels the weight force to a force-measuring transducer.

When a balance is used in a laboratory to perform a series of measurements, the load is often brought from a stationary holding location to the balance by means of a load-handling device (robot). The purpose of using a load-handling device is, on the one hand, to gain efficiency through automation and, on the other hand, to avoid the manual handling of loads which, in the specific case of calibration laboratories, will include small precision weights such as wire weights, sheet-metal weights or button-handle weights. In the case of a comparative measurement on a so-called mass-comparator balance, the load can be constituted by a plurality of weights that have to be picked up from the stationary holding location and brought to the balance. Balances of this kind are used for a process of weight comparison and are therefore equipped with a plurality of devices for receiving the weighing load. The latter are constituted in general by weighing pans arranged in a horizontal plane and acting on a common force transducer. Using a balance of this kind requires particular diligence, because a shift in the center of gravity can lead to errors in the result of the measurement. However, having to work with special diligence reduces the speed at which the process can be performed.

As an additional difficulty, the individual load receivers are radially offset from a vertical axis through the center point of load application of the force transducer, resulting in a so-called eccentric loading error, which is caused by a shift of the combined center of gravity when different weights are placed in different locations. Some balances have load-centering weighing pans equipped with a device that seeks to bring the center of gravity in line with the central axis, e.g., through an arrangement where the pan floats on ball bearings in a shallow spherical shell. However, this solution is not always satisfactory.

OBJECT OF THE INVENTION

It is therefore the object of the present invention, to speed up the process of operating a balance, specifically a comparator balance, while at the same time reducing the potential for errors of the aforementioned kind. In particular, the present invention aims to avoid eccentric loading errors in balances where the weight is applied through a plurality of load-receiver devices.

SUMMARY OF THE INVENTION

In accordance with the present invention, the foregoing objective can be met by using a method of weighing a load on a balance equipped with load-receiving devices for loads of different shapes and sizes, wherein the load is set down in at least one of three locations, one of which is a stationary holding location, another location is a load-handling device, and a third location is a load-receiver portion of the balance. In particular, the balance is a mass-comparator balance, and the load consists of weights or mass standards of different shapes and sizes. The load-receiver portion supports the weight of the load and channels the weight force to a force-measuring transducer. The distinguishing feature of the invention is that the at least one location where the load is set down has at least two load-receiving positions arranged vertically above each other.

By using a vertical arrangement of load positions, it is possible to handle the loads of the vertically stacked positions together. Also, the combined center of gravity of the vertically stacked loads will essentially not shift around horizontally, regardless of how many of the vertically stacked loads are handled simultaneously.

An even greater advantage is gained from the inventive concept, if the load is set down in at least two of the locations one of which is a stationary holding location, another location is a load-handling device, and a third location is a load-receiver portion of the balance, where each of the at least two locations has at least two load-receiving positions arranged vertically above each other.

This facilitates picking up the load at one of the ocations and setting it down at the other, particularly in case where the load consists of several load portions hat are handled simultaneously.

As mentioned above, the locations where the load is set down are to be selected from no more than three locations whose functions are advantageously coordinated in the operation of the balance. One of these locations can be the stationary holding location for the weighing load, particularly a load consisting of weights (also called mass standards). An apparatus incorporating this feature of the invention is distinguished by having a stationary holding location for the load, particularly a load consisting of weights, with at least two cantilevered portions such as prongs, arms or the like, which are arranged vertically above each other and allow free access from below.

It is advantageous to combine a stationary holding location of this kind, e.g., for weights, with a handling device that has a corresponding vertical arrangement of positions, because this allows the use of a simple configuration without separately movable parts for the handling device. However, it is also possible to configure only the handling device by itself according to the inventive design, for example for performing the process of simultaneously moving a plurality of load portions that are supported in an arrangement of vertically stacked positions. An apparatus incorporating this feature of the invention is distinguished by having a handling device with at least two cantilevered portions such as prongs, arms or the like that are arranged vertically above each other. Finally, in an advantageous embodiment of an apparatus according to the invention, the eccentric loading error is avoided by using a vertically stacked arrangement of the load-receiver devices of a balance, i.e., weighing pans, weighing baskets, or arms for suspending the load, coupled to the force transducer by way of a force-transferring member located either above or below the vertical arrangement of load-receiver devices.

Because the load-receiver devices are vertically stacked either above or below a force-transferring member introducing the load to the force transducer, the centers of gravity of the load portions resting on the load-receiver devices are essentially in vertical alignment, so that the line of action of the combined weight force is spatially fixed in relation to the force-transferring member. Consequently, with the center of gravity not shifting around, the inventive apparatus is free from eccentric loading errors.

It is entirely within the scope of the invention to arrange the force transducer, also referred to as a weighing cell, at the top and use a pendulous configuration for the load-receiver devices. However, in the interest of operating convenience, particularly in a robot-operated balance using the load-handling device described above, as well as for other reasons, the preference goes to a vertical arrangement of the load-receiving devices above the force-transferring member as will be described in the context of the drawing.

The design of load-receiver devices for a balance poses a particular problem in the case where load-handling devices are to be used for putting the weighing objects on the balance. The use 6f robots of this kind keeps the weighing objects and the balance from being touched by an operator. The design task to be solved is particularly challenging in the case where a plurality of load-receiving devices is involved.

According to the invention, the solution to the problem lies in a design for each of the load-receiving locations where all or at least a part of the respective load-supporting devices are configured in the shape of forks with prongs that are open to one side. This basic design is of inventive significance regardless of an overall arrangement of a plurality of devices and whether a plurality or only a single device are provided in any given case. Although load-receiving devices of a perforated, non-continuous kind in the shape of grills or baskets are known per se, the available state-of-the-art devices are unsuitable for use with a robot because the perforations or slits in the grill patterns are enclosed, unlike a fork where the interstices between the prongs are open to one side. The significance of the concept of fork prongs that are open to one side will become evident from the following description of a preferred embodiment. It will also be made clear that an analogous configuration of the load-handling device is of advantage.

Further details of the invention will become clear from the following description of embodiments that are illustrated in the drawings.

BRIEF DESCRIPTION OF THE DRAWING

FIG. 4 illustrates in a cross-sectional side-view how a load-handling device cooperates with the modular unit of FIG. 3 and the load-receiving device of FIG. 6;

FIGS. 5a and 5b illustrate in a cross-sectional front-view how a load-handling device cooperates with the modular unit of FIG. 3 and the load-receiving device of FIG. 6;

DETAILED DESCRIPTION OF THE PREFERRED EMBODIMENT

Figure 1:
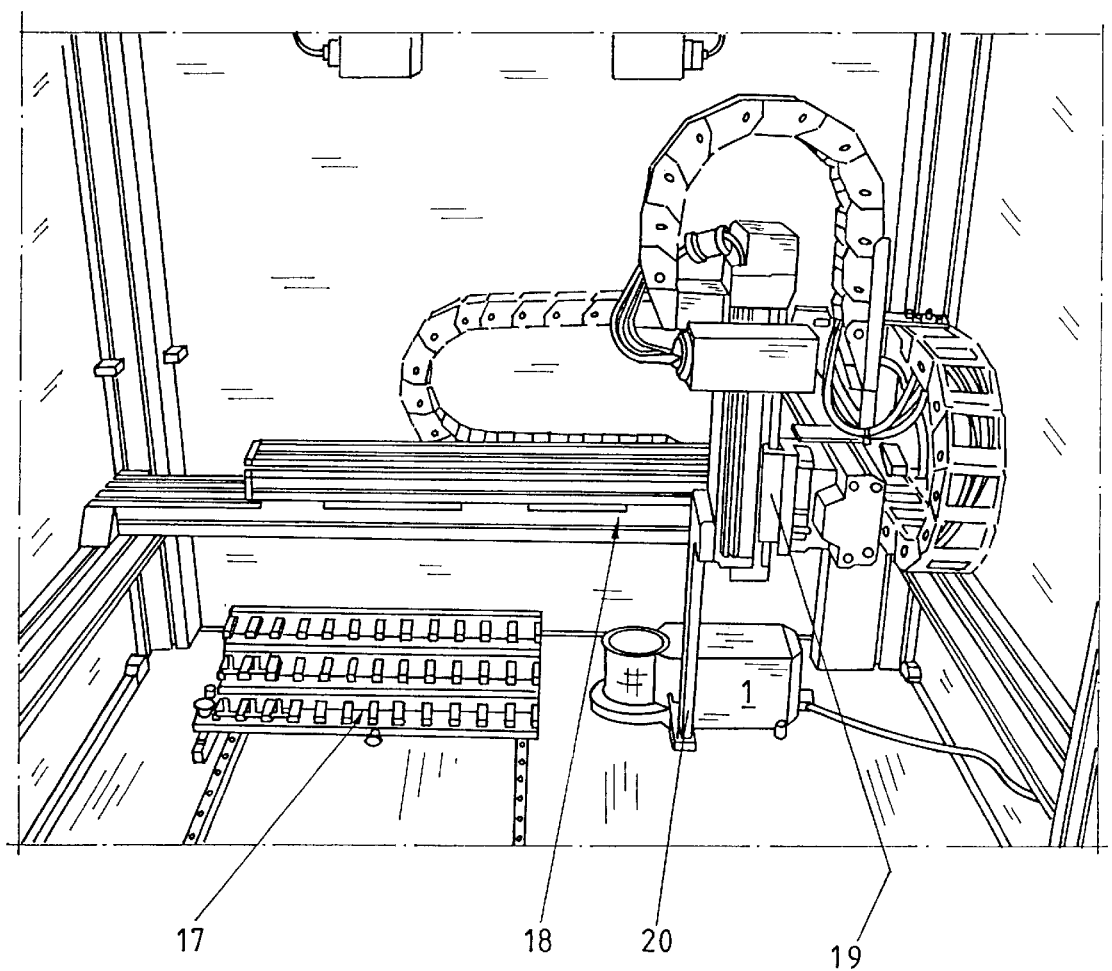
FIG. 1 of the attached drawing represents a perspective view of the parts that cooperate in the case of the best mode of operating a comparator balance in accordance with the invention.

FIG. 1 illustrates an arrangement containing all of the devices that can be employed in performing the method according to the invention. Closed off inside a compartment for protection from environmental factors such as temperature, air drafts etc. are a balance 1, a holding location 17 for different shapes and sizes of weights that can be combined in a weighing load, as well as a handling device with an arm 20 mounted on a translatory slide support 19 which enables the handling device to move parallel and transverse to a guide track 18. This arrangement serves to run an automated process of comparative weighing within a relatively narrow space. The balance can also be of a configuration as will be described subsequently in the context of FIG. 7

Figure 2:
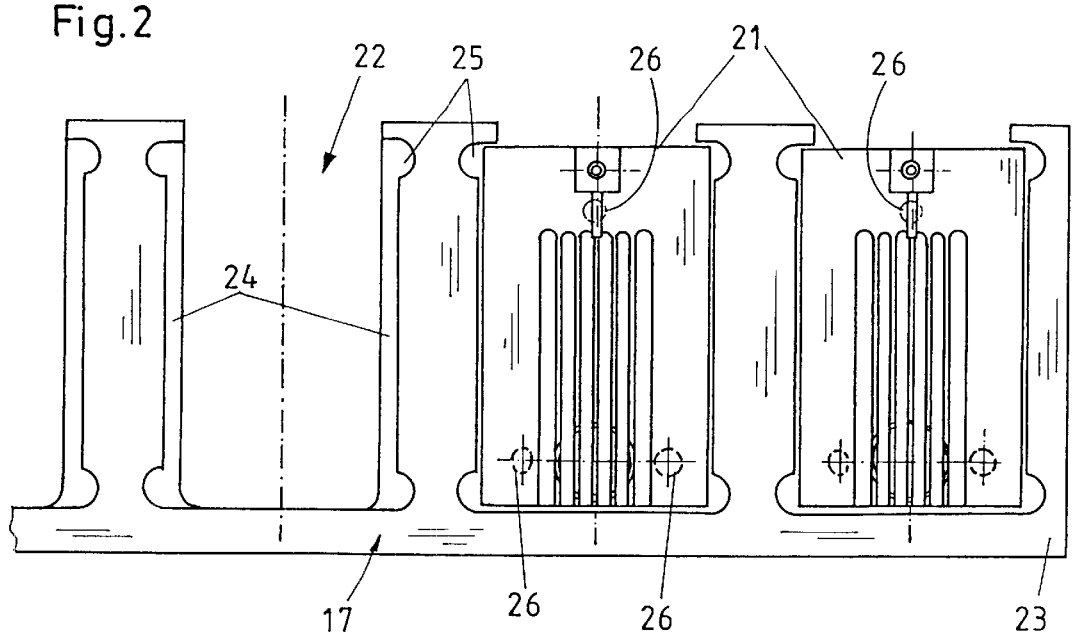
FIG. 2 represents a top view of a stationary holding location for different weights configured as an arrangement of separately removable modular units.

FIG. 2 shows a top view of the front row of the stationary holding location 17 of FIG. 1. The arrangement consists of a frame 23 with a plurality of cutouts 22 in which the load-support modules 21 are seated. The cutouts 22 have stepped-down edge profiles 24 to hold the borders of the load-support modules 21. Recesses 25 in the stepped-down profiles 24 make it easier to lift the modules 21 out of the frame 23.

As illustrated in detail in FIGS. 4 and 5, the individual load-support modules 21 are seated on locator pins 27 entering into seating holes 26 of the load-support modules. As indicated by a broken line in the top view of FIG. 2, at least some of the seating holes 26 (as shown in the left-hand part of the modules illustrated) can have a non-circular shape, specifically an oval shape.

Figure 3:
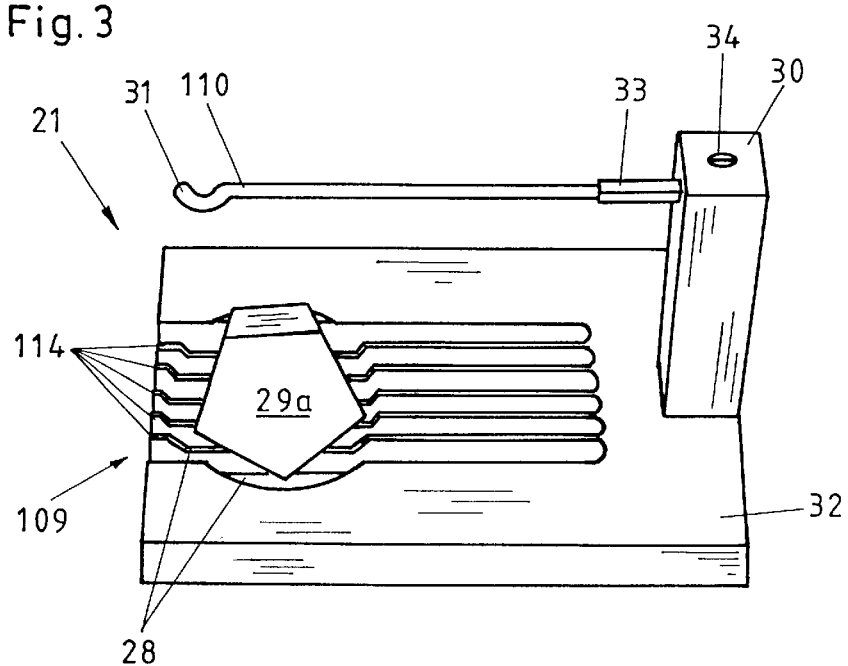
FIG. 3 illustrates one of the modular units of FIG. 2 in a perspective view.

FIG. 3 shows the design concept used for each of the load-support modules 21 with a two-level vertical arrangement of load-receiving positions. The lower position 109 has the shape of a grill of open-ended cantilevered prongs 114 incorporated in a plate 32. A depression 28 in the pronged portion serves to receive a sheet-metal weight 29a or a button-handle weight 29c (FIGS. 5a, 5b). Different diameters are selectable for the depressions 28, corresponding to the different sizes of the sheet-metal and button-handle weights 29a, 29c. The load-support module further has a support post 30 with a single cantilevered arm 110 ending in a hook 31 for holding wire weights 29b at a second vertical position, i.e., above the position 109, of the load-support module 21.

In keeping with the modular concept, the support post 30 could be removably attached to the plate 32, as indicated by the fastening screw 36 in FIG. 4), the arm 110 could be held interchangeably in a sleeve 33, and the support post 30 could be provided with a connector opening 34 where a vertical extension of the support post, particularly for an additional load-receiving position, could be connected by means of a screw or dowel pin. However, the opening 34 could also be provided only for the purpose of clamping the sleeve 33 and/or the arm 110 by means of a clamping screw 35 as shown in FIG. 4.

FIGS. 4, 5a and 5b illustrate how the arm 20 of the load-handling device cooperates on the one hand with the load-receiving device 115 that is connected to the force transducer of the balance and on the other hand with the load-support module 21. FIG. 4 gives a side view, and FIGS. 51a and 5b a frontal view. In FIG. 5a, the arm 20 is shown in the load-transporting position, while in FIG. 5b, the arm is shown in the lowered position, i.e., the position where the weighing can take place.

The arm 20 has two plates 37 and 37a connected by a screw 38 with an interposed level-adjusting insert 39. The pins 27 serve to carry the support module in a defined, centered position.

The load-handling device has translatory mobility in three dimensions on a slide support 19 running on tracks (see FIG.

1). Thus, the weights 9a, b, c sitting on support modules 21 can be transported by the load-handling device from the stationary holding location 17 to the load-receiving device 115 of the balance where the weighing takes place and from where the weights are subsequently brought back to the stationary holding location 17. The support modules 21 as well as the load-receiving device 115 have open-ended prongs to allow the weights to be picked up and set down by means of the arm 20.

Figure 6:
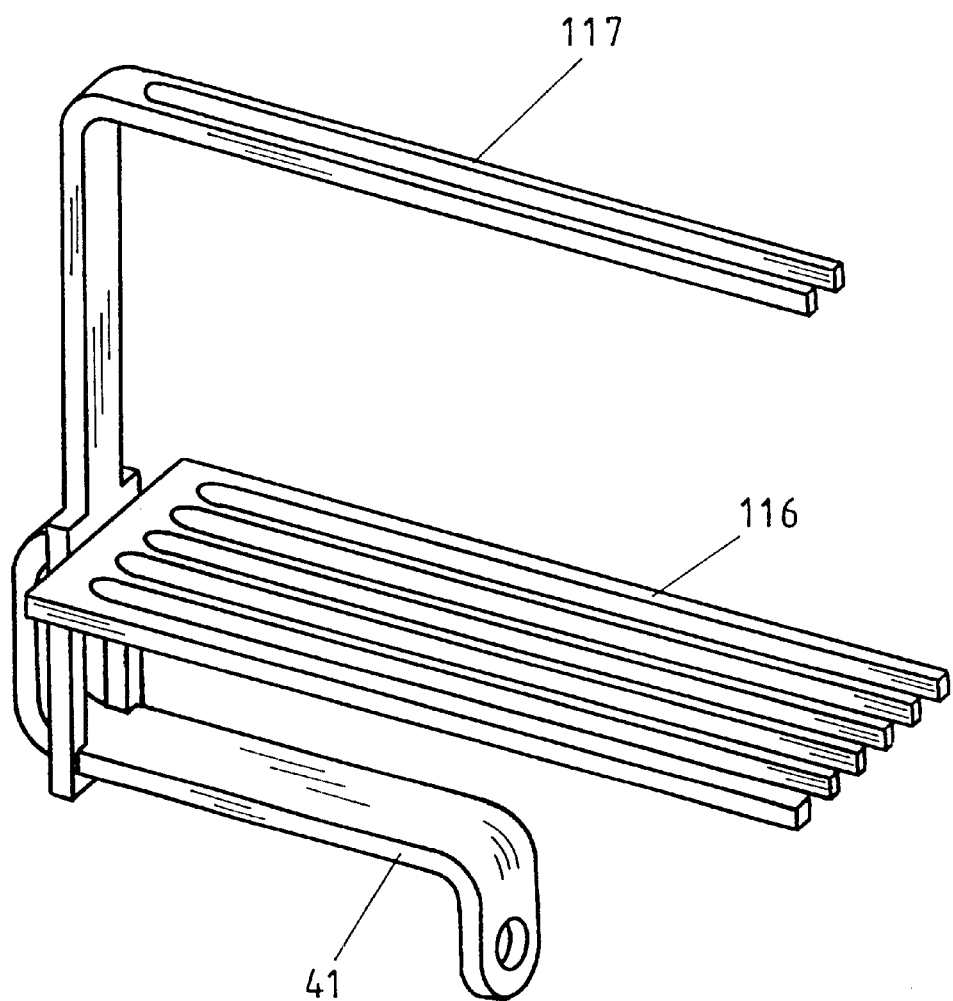
FIG. 6 illustrates a particularly preferred configuration for the load-receiving device of the balance.

FIG. 6 gives a three-dimensional view of the load-receiving device 115 detached from the force transducer of the balance. The load-receiving device 115 consists of a connector arm 41 by which the device is attached to the force transducer of the balance, the actual comb- or grill-shaped load-receiving area 116 for sheet-metal weights 29a or button-handle weights 29c, and the upper load-receiving portion 117 for wire weights 29b.

The weighing cycle runs as follows: T he load-handling device fetches from the holding location 17 a support module 21 that carries a weight, which can be a sheet-metal weight, button-handle weight, or a wire weight. The support module holding the weight is transported to the balance (see FIG. 5a), and the weight is set down or suspended (depending on the kind of weight) on the load-receiver device 115. The arm of the load-handling device with the empty support module is retracted, and the weighing can be started (see FIG. 5b). After the weighing, the same sequence of steps is performed in reverse order, whereupon a new cycle can begin.

Figure 7:
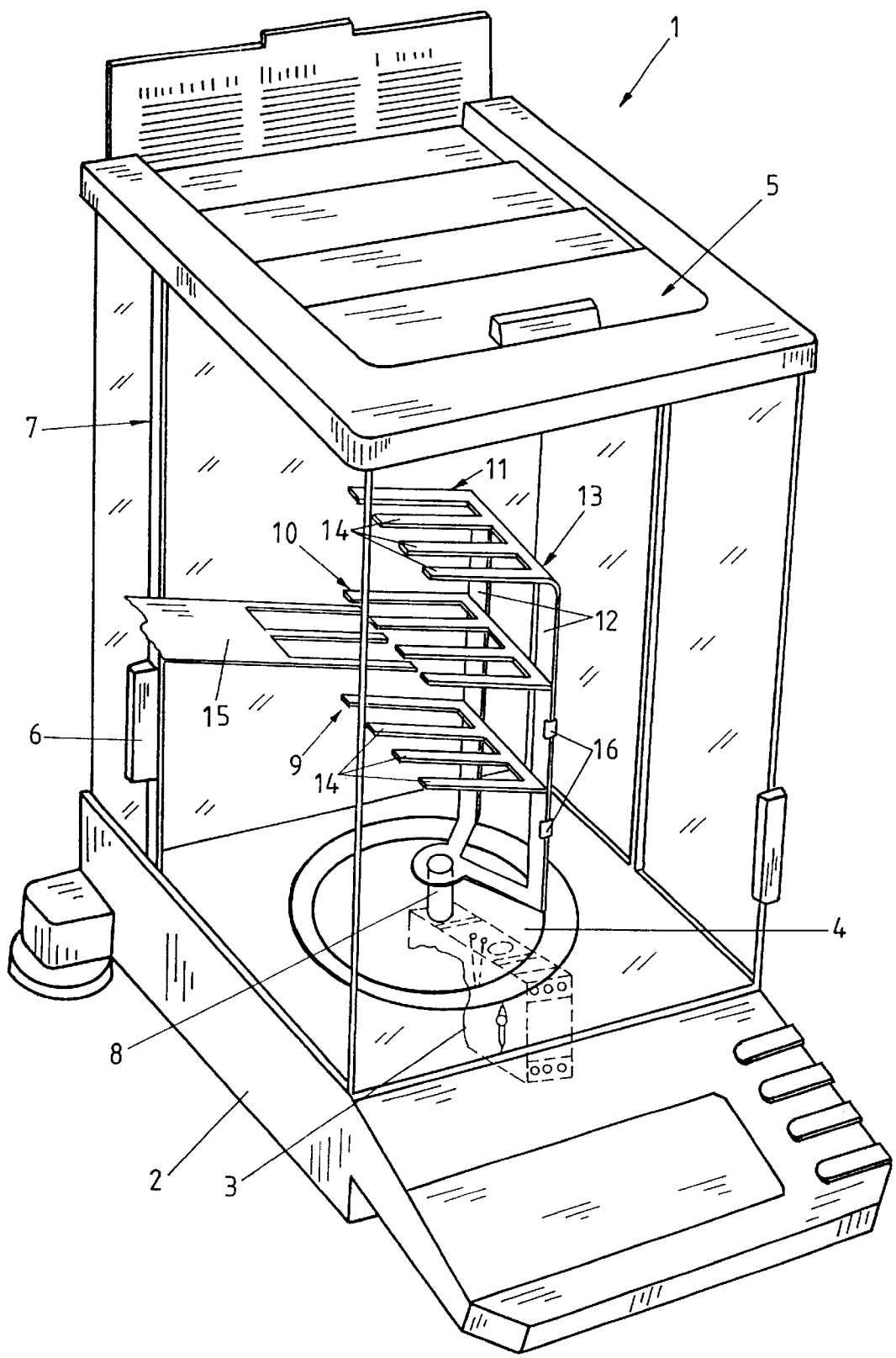
FIG. 7 illustrates how another handling device according to the invention cooperates with a balance configured in accordance with the invention.

FIG. 7 shows a balance 1 of a kind that is described in detail in EP-A 0 556 473 except for the features that belong to the present invention. The disclosure of EP A 0 556 473 is to be considered as included by reference and will therefore not be repeated here, except for the essential fact that the balance 1 has a force transducer 3 (indicated by a broken line) arranged inside a balance housing 2 below a space 4 where the weighing pan is located. On top of the balance housing 2 is a draft-shielding enclosure 5 with side walls that are at least partially removable or slidable in order to give access to the interior of the draft-shielding enclosure 5. For example, in FIG. 7 the left side wall 7 is pushed back as indicated by the position of the handle 6, whereby the left-side access to the draft-shielding enclosure 5 is opened.

In the illustrated embodiment, the weighing pan has been removed. The design details can be analogous to the arrangement presented in CH-A 679 949, according to which a weighing pan is removably seated on a bolt-shaped load-receiving post of a force-transferring member of a force-transducer 3. An analogous load-receiving post 8 (as shown in FIG. 7) is also part of the embodiment of the present invention.

In accordance with the present invention, three load-receiver forks 9, 10, 11 are connected to the load-receiving post to hold the objects that are to be weighed. The load-receiver forks 9, 10, 11 are held by rigid essentially vertical frame members 12 of a support frame 13. Thus, the center of gravity of the load does not shift even if weights of different shapes and sizes are placed on the load-receiver forks 9, 10, 11.

From a manufacturing point of view, it may be desirable if each of the load-receiver forks has its own support frame of appropriate height, so that each load-receiver fork together with its support frame can be manufactured as an integral stamped and press-formed part. In an arrangement of this kind, it will only be necessary to connect the vertical frame members belonging to the respective forks 9, 10, 11 to each other so that they become an integral support frame 13, e.g., by point-welding. Another connecting method is to provide the vertical frame members 12 of the uppermost load-receiver fork 11 with folding flaps 16 for the attachment of the lower vertical frame members of the load-receiver forks 9 and 10 that are located below the fork 11.

The arrangement of the receiving devices for the weighing objects with fork prongs 14 that are open towards one side (e.g., to the left in the illustrated arrangement of FIG. 7) allows the use of a robot equipped with a transporting fork 15 of a complementary prong configuration. The configuration of the robot per se is not restricted, even though the illustrated arrangement has only one vertical level of prongs. Depending on the application, the load-handling device can, of course, be of an analogous configuration as the concept of FIGS. 4, 5a, 5b that was described above, and if desired, it could also have in place of the fork 15 an individual hook for a wire weight, analogous to the hook 31. It is self-evident that the holding location 17 could have more than two levels, analogous to the three levels 9 to 11, e.g., for large weights 29c, sheet- metal weights 29a and wire weights 29b.

As the transporting fork 15 delivers weighing objects to set them down on one of the load-receiver forks 9, 10 or 11, the transporting fork 15 only needs to be moved into a position above the respective load-receiver fork, whereupon it is lowered so that the prongs of the transporting fork 15 move downwards between the prongs 14 of the respective load-receiver fork 9, 10 or 11 to the point where the weighing object is passed from the transporting fork 15 to the respective load-receiver fork 9, 10 or 11. Now, the transporting fork 15 is retracted to the left, moved out of the confines of the draft-shielding enclosure 5, and the weighing compartment door 7 can be shut while the weighing process is taking place.

Numerous modifications are conceivable within the scope of the invention; as an example, the load receiver 3 of the balance 1 could be in the upper area of the weighing compartment with the load being suspended from the load receiver.

What is claimed is:

1. A method of weighing a load having at least two load portions on a balance, wherein the load portions have different shapes and sizes, wherein the load that is to be weighed is set down in and picked up from at least one of three locations, a first location being a stationary holding location, a second location being a load-handling device, and a third location being a load-receiver portion of the balance, wherein of the three locations at least the load-receiver portion has at least two load-receiving positions arranged vertically above each other, the method comprising simultaneously setting down and picking up the at least two load portions in the at least two load-receiving positions.

2. An apparatus for weighing loads of different shapes and sizes on a balance, comprising three locations where the load that is to be weighed is set down and picked up, a first location being a stationary holding location, a second location being a load-handling device, and a third location being a load-receiver portion of the balance, the improvement comprising that of the three locations at least the load-receiver portion has at least two load-receiving positions arranged vertically above each other.

3. The apparatus of claim 2, wherein at least two of said first, second and third locations have at least two load-receiving positions arranged vertically above each other, wherein the at least two load-receiving positions have equal vertical distances from each other in each of the at least two locations.

4. The apparatus of claim 2, wherein the stationary holding location has at least two load-receiving positions arranged vertically above each other, wherein the at least two load-receiving positions are comprised of cantilevered projecting elements allowing free access from below.

5. The apparatus of claim 4, wherein a lower cantilevered projecting element comprises a row of fork prongs and at least one upper cantilevered projecting element comprises a cantilevered arm to receive a hanging load.

6. The apparatus of claim 2, wherein the stationary holding location comprises a row of at least two load-support modules, each of which has at least two load-receiving positions consisting of cantilevered projecting elements arranged vertically above each other and allowing free access from below.

7. The apparatus of claim 2, wherein the load-handling device has at least two load-receiving positions arranged vertically above each other, wherein the at least two load-receiving positions are comprised of cantilevered projecting elements.

8. The apparatus of claim 7, wherein the cantilevered projecting elements of at least one load-receiving position of the load-handling device have free ends facing away from the weight-handling device, with open-ended slits between the free ends.

9. The apparatus of claim 2, wherein the load-receiver portion comprises a plurality of load-receiving positions mounted vertically stacked in a vertical line through a point of force application located on a force-transmitting element that provides a force-transmitting connection with a force transducer of the balance.

10. The apparatus of claim 9, wherein the load-receiving positions of the load-receiver portion are stacked above the force-transmitting element.

11. The apparatus of claim 9, wherein at least a part of the load-receiving positions of the load-receiver portion comprise cantilevered projecting elements with free ends and open-ended slits between the free ends.

12. The apparatus of claim 10, wherein at least two of said load-receiving positions are held by at least one essentially vertical frame member common to the at least two load-receiving positions.

13. The apparatus of claim 12, wherein at least one of the load-receiving positions is shaped like a fork with prongs facing away from the at least one vertical frame member.

* * * * *